(12) United States Patent
Chapman et al.

(10) Patent No.: US 10,616,547 B1
(45) Date of Patent: Apr. 7, 2020

(54) MULTI-VANTAGE POINT LIGHT-FIELD PICTURE ELEMENT DISPLAY

(71) Applicant: Disney Enterprises, Inc., Burbank, CA (US)

(72) Inventors: Steven M. Chapman, Thousand Oaks, CA (US); Joseph Popp, Cerritos, CA (US); Steven Kosakura, Tustin, CA (US); James Bumgardner, Los Angeles, CA (US); Mehul Patel, Stevenson Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/276,516

(22) Filed: Feb. 14, 2019

(51) Int. Cl.
*G09G 3/00* (2006.01)
*H04N 13/111* (2018.01)
*H04N 13/363* (2018.01)
*F21V 8/00* (2006.01)
*G09G 3/32* (2016.01)
*G03B 21/20* (2006.01)

(52) U.S. Cl.
CPC ......... *H04N 13/111* (2018.05); *G02B 6/0006* (2013.01); *G02B 6/0081* (2013.01); *G03B 21/2033* (2013.01); *G09G 3/32* (2013.01); *H04N 13/363* (2018.05)

(58) Field of Classification Search
None
See application file for complete search history.

(56) References Cited

U.S. PATENT DOCUMENTS

| 2015/0124171 A1* | 5/2015 | King | H04N 5/268 348/588 |
| 2016/0070346 A1* | 3/2016 | Prosserman | G11B 27/031 463/29 |

* cited by examiner

*Primary Examiner* — Martin Mushambo
(74) *Attorney, Agent, or Firm* — Sheppard Mullin Richter & Hampton LLP

(57) ABSTRACT

A pixel projection component for projecting a multi-vantage point light-field includes a distal layer with a plurality of apertures disposed therein, each of the plurality of apertures traversing the distal layer between a convex outer surface and a concave inner surface, and an intermediate layer comprising a plurality of light guides, the intermediate layer being mechanically coupled to the distal layer such that a proximal end of each light guide of the plurality of light guides is oriented to accept light transmissions from a corresponding light source and a distal end of each light guide is oriented to transmit the light transmission through a corresponding aperture of the plurality of apertures, such that the light is directed to targeted vantage points corresponding to the corresponding aperture, and causing different light transmissions to be transmitted to different vantage points.

20 Claims, 11 Drawing Sheets

MULTI-VANTAGE POINT LIGHT-FIELD PICTURE ELEMENT DISPLAY

BACKGROUND

Events, motion pictures, theater performances, television shows, theme park rides, travel destinations and tours, and other forms of entertainment and services are sometimes advertised using elaborate displays such as posters, cardboard cutouts, and/or models. For example, soon-to-be-released motion pictures may be advertised using a printed cardboard and/or plastic cutouts displayed in movie theater lobbies to illustrate characters or scenes from the motion picture. In some examples, the displays include lights, moving components, and/or projections to attract attentions. These displays are generally strategically positioned to catch the eye of movie-goers as they walk through the lobby. However, they are generally designed to be viewed from a single or limited number of vantage points, and present only a single view-point of the scene. They also generally can only presented in two dimensions, or include multiple layers from a scene, but each layer is only two dimensional. This is because movie-goers walking through a movie theater lobby do not usually wear special glasses to enable three-dimensional viewing. This limits the ability to present the display to viewers at different angles and vantage points, and may limit the overall effectiveness of the display to market the motion picture, entertainment content, or other service to a target audience.

SUMMARY

Embodiments of the present disclosure provide a multi-vantage point light-field element display. In some examples, the display may be a 3-dimensional light-field picture element display. In some examples, the 3-dimensional light-field picture element array display system may be used, either alone or in combination with a poster, cardboard cutout, or model display system, to display content for viewing from multiple viewpoints and/or perspectives. For example, the display system may be configured to present a scene from a first vantage point at a first angle of view, and present the same scene from a second vantage point at the second angle of view. The display system may present the scene from various vantage points covering a near-continuous spectrum of corresponding view angles across a wide field of view (i.e., 90 degrees or more, and in some examples, 180 degrees and up to 360 degrees). The display system may be used to display content for the purpose of promoting an event, motion picture, theater performance, television show, theme park ride, travel destination, tour, and/or other form of entertainment or service.

Embodiments disclosed herein provide a pixel projection component for projecting a multi-vantage point light-field. In some examples, the pixel projection component includes a distal layer with a plurality of apertures disposed therein, each of the plurality of apertures traversing the distal layer between a convex outer surface and a concave inner surface; and an intermediate layer with a plurality of light guides, the intermediate layer being mechanically coupled to the distal layer. The proximal end of a first light guide of the plurality of light guides may be oriented to accept a first light transmission from a first light source, and a distal end of the first light guide may be oriented to transmit the first light transmission through a first aperture of the plurality of apertures, such that the light is directed to a first vantage point. Similarly, a proximal end of a second light guide of the plurality of light guides may be oriented to accept second light transmission from a second light source and a distal end of the second light guide is oriented to transmit the second light transmission through a second aperture of the plurality of apertures, such that the light is directed to a second vantage point. Similar optical connectivity and orientation may also apply to other apertures and light guides of the pixel projection component.

In some examples, the first light transmission is not visible from the second vantage point and the second light transmission is not visible from the first vantage point. In some examples, the axial dimension of each aperture is long enough to block or inhibit light transmission across vantage points as described above. For example, in some embodiments, the ratio of axial length to diameter for each of the plurality of apertures is about 1 to 1.

In some embodiments, the pixel projection component includes a proximal layer with a plurality of light emitting elements. For example, the first light source may include a first light emitting element of the plurality of light emitting elements and the second light source may include a second light emitting element of the plurality of light emitting elements. The light emitting elements may be light emitting diodes ("LEDs"), organic light emitting diodes ("OLEDs"), laser diodes, liquid crystal displays, or other display technologies. In some examples, the plurality of apertures is located at an equal distance from each adjacent aperture. In some examples, the plurality of apertures are located in a spiral pattern using the Fibonacci sequence. In some examples, the plurality of light guides comprises fiber optic cables or micro-machined wave guides.

Some embodiments of the present disclosure provide a system for generating a multi-vantage point light-field display using multiple pixel projection components as disclosed herein, a display driver, and a data store with image data stored thereon, the image data including a pixel array used by the display driver to cause light emitting elements in the multiple pixel projection components to activate, transmit light, and create images with different views, wherein each view is only visible from selected target vantage points.

Some embodiments of the present disclosure provide a method for generating a multi-vantage point light-field display using pixel projection components as disclosed herein, a display driver, and a data store with image data stored thereon, the image data including a pixel array used by the display driver to cause light emitting elements in the multiple pixel projection components to activate, transmit light, and create images with different views, wherein each view is only visible from selected target vantage points.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

Further aspects of the present disclosure will be more readily appreciated upon review of the detailed description of the various disclosed embodiments, described below, when taken in conjunction with the accompanying figures.

The figures are described in greater detail in the description and examples below. Examples are provided for purposes of illustration only, and merely depict typical or example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

DETAILED DESCRIPTION

One or more embodiments of the present disclosure are directed to systems, methods, and devices, for projecting three-dimensional theater lobby displays. In various deployments described herein, a pixel projection component with a plurality of apertures projects images at multiple directions in order to provide a complete three-dimensional depiction of the display. Projecting the images at multiple angles allows a three-dimensional effect to be experienced by a user without the need of conventional 3D glasses or aperture-masks. A user may also experience different aspects of the display as the user changes viewpoint position of the display. A display driver system feeds video into the pixel projection component system that then projects the video into the three-dimensional display.

The details of some example embodiments of the systems, methods, and devices of the present disclosure are set forth in this description and in some cases, in other portions of the disclosure. Other features, objects, and advantages of the disclosure will be apparent to one of skill in the art upon examination of the present disclosure, description, figures, examples, and claims. It is intended that all such additional systems, methods, devices, features, and advantages be included within this description (whether explicitly or by reference), be within the scope of the present disclosure, and be protected by one or more of the accompanying claims.

Figure 1A:
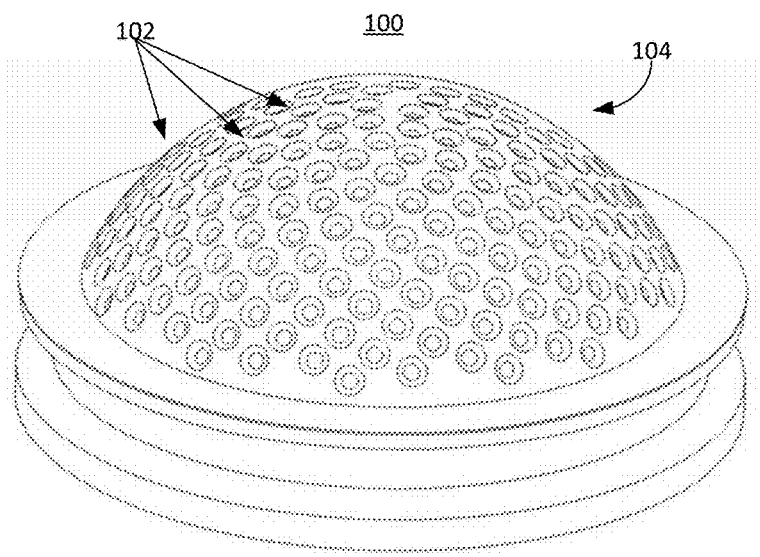
FIG. 1A illustrates a perspective view of an example light field display pixel projection component, consistent with embodiments disclosed herein.
Figure 1B:
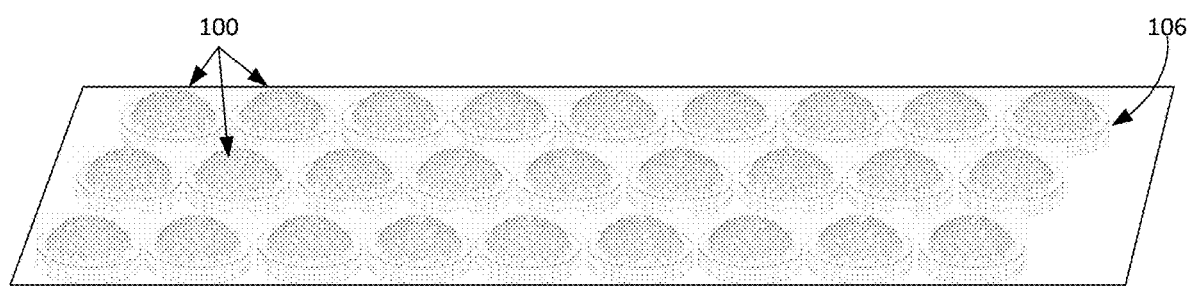
FIG. 1B illustrates a perspective view of an example flat light field display, including an array of light field display pixels, consistent with embodiments disclosed herein.
Figure 1C:
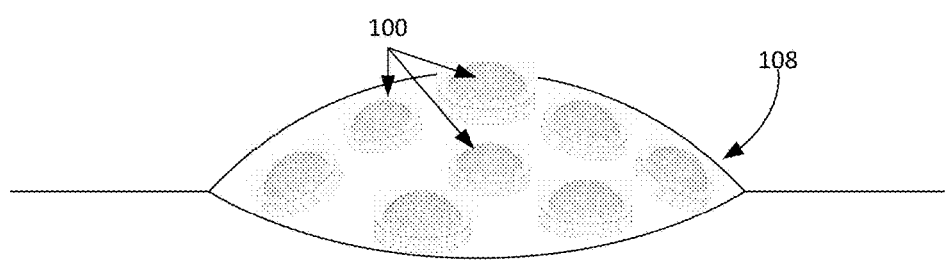
FIG. 1C illustrates a perspective view of an example curved light field display, including an array of light field display pixels, consistent with embodiments disclosed herein.

FIG. 1A illustrates a perspective view of an example light field display pixel projection component 100 that may be used to project a pixel for a three-dimensional display. FIG. 1B illustrates a perspective view of an example flat light field display, including an array of light field display pixels. FIG. 1C illustrates a perspective view of an example curved light field display, including an array of light field display pixels. In example implementations, the three-dimensional display may include images or video, where both the images and video may include pre-rendered animations, previously captured video or images of an actor or a performance, live captured images or video, or any combination of the above images and video. A digital display will generally be comprised of a pixel array of pixel elements, wherein each pixel element of the display will project a point (or approximated point) of light to an intended viewer's eye(s). All of the pixel elements of the pixel array may be projected and viewed together to give the viewer the illusion that they are looking at a single image, wherein the image is comprised of the points (or approximated points) of light projected from the pixel elements. The pixel elements may be activated together or in a timed sequence (e.g., using a raster pattern), wherein the timed sequence is fast enough to display all of the pixel elements at least within the time it takes to display a single frame of a video or motion picture. Generally, the pixel array includes only a single pixel element for any given point in a two-dimensional space (i.e., a single pixel element for any x-y location).

Embodiments of the present disclosure enable the simultaneous display of multiple pixel elements for any given x-y location, wherein each pixel element for a given x-y location may be contemporaneously projected to a different target vantage point in space, such that a viewer looking at the pixel will see it change (i.e., project a different pixel element) as the viewer moves to different target vantage points. The pixel array stored in a data store, which comprises pixel information for each pixel element projected in a given image, including x and y coordinates, would also include an additional dimension for target vantage point angle. Accordingly, the pixel array may include multiple views of a given image, each view tracking the same set of pixel locations, but with a different pixel element and different pixel information, such that each view shifts slightly in appearance as the viewer moves to different target vantage points. This shifting in image appearance gives a viewer the illusion that the image is changing, and can give the illusion that the image is being projected in three-dimensions because the viewer is presented with different perspectives of the same image as the viewer moves in space.

Referring to FIG. 1A, one or more embodiments of pixel projection component 100 may include an outer surface 104 with a plurality of apertures 102 located thereon. In some examples, apertures 102 of may be shaped rounded opening edges that can be used to limit dust capture and edge reflections. Light may be emitted through apertures 102 to present a pixel of an image to a viewer located at a target vantage point with respect to pixel projection component 100. Because the outer surface 104 of pixel projection component 102 is rounded, each aperture 102 is positioned to allow and direct light to a different location in space (i.e., a different target vantage point). Accordingly, pixel projection component 100 can display multiple pixel elements for a display used to project light to create a three-dimensional effect for users without the need of conventional 3D glasses or aperture-masks. The outer surface 104 of the pixel projection component 100 may be convex, allowing the apertures 102 to project light in any direction. The outer surface 104 of the pixel projection component 100 may be spherical, semi-spherical, parabolic, or any other type of curved surface.

The number of apertures 102 on the outer surface 104 of the pixel projection component 100 is not limited and may vary depending on the desired three-dimensional display to be projected. In one or more embodiments, each of the plurality of apertures 102 in the pixel projection component 100 may project an individual aspect of a single image or video to be projected, thereby creating a complete display of a single image or video by using each of the plurality of apertures 102.

Alternatively, in some embodiments, groups of apertures 102 may be used to project complete images or videos from a pixel projection component. The positioning of the apertures may vary. In some embodiments, the apertures may be placed evenly apart from each other throughout the outer surface 104 of the pixel projection component 100. In some examples, apertures 102 may be positioned with variable spacing using a spiral pattern. In some examples, apertures 102 may be positioned using a Fibonacci sequence along outer surface 104, e.g., making a spiral pattern similar in arrangement to the seeds on a sunflower.

Referring to FIG. 1B, in some examples, multiple pixel projection components 100 may be arranged on a display panel 106 to create a composite image. For given pixel projection components 100 on display panel 106, first pixel elements may be directed through corresponding apertures 102 to the a first target vantage point to present a pixel from the x-y coordinate of the pixel array corresponding to the first target vantage point, such that a viewer standing at the first target vantage point may be presented with a first image. And, for given pixel projection components 100, second pixel elements may be directed through corresponding second apertures 102 to the second target vantage point, such that the viewer standing at the second target vantage point may be presented with a second image, which may be a different perspective of a scene displayed in the first image. Accordingly, as the viewer moves to different vantage points, and creates different viewing angles with respect to display panel 106, different perspectives of an scene may be presented to the viewer, as different images, projected from different sets of pixel elements through corresponding sets of apertures 102.

Referring to FIG. 1C, in some examples, the multiple pixel projection components 100 may be arranged on a curved display panel 108, shaped to enhance the three-dimensional effect projected to viewers as they move to different vantage points. In some examples, display panel 108 may be parabolic, hemi-spherical, spherical, or other curviplanar shapes.

In some examples, the pixel projection components 100 and/or display panels 106 or 108 may be integrated into a poster, model, cutout, or other fixed-medium display to create an integrated display. For example, pixel projection components 100 and/or display panels 106 may be overlain and/or incorporated with printed movie poster artwork to create an integrated display. In some examples, multiple display panels may be integrated or used in a single integrated display. Pixel projection components 100 and/or display panels 106 or 108 may be communicatively coupled to a display driver logical circuit and configured to display a static image, or a series of images as to create a motion picture and/or animated effect. In some examples, pixel elements and corresponding apertures 102 may be oriented on a pixel projection component 100 to create a stereoscopic effect by projecting slightly offset (stereoscopic) image data to pairs of target vantage points that are spaced apart at approximately the distance between a viewer's eyes when the viewer is standing at a desired distance from pixel projection component 100. In some examples, pixel projection component 100 may be communicatively coupled to a sensor (e.g. an optical sensor) configured to detect the location of the viewer relative to the pixel projection component 100, and/or motion of the viewer. The display driver may then be configured to modify the image data projected from pixel projection component 100 based on the relative position of the viewer.

In some embodiments, image data sent to adjacent pixel projection components may be obtained from offset images of the same scene, wherein the offset is selected to create a parallax disparity between the images. This parallax disparity creates a perception of three-dimensional depth. In other embodiments, a parallax disparity may be generated by projecting offset image data from different pixel elements from the same pixel projection component. In some embodiments, the parallax disparity between two offset images may be altered using a proximity sensor. The parallax disparity between the offset images may vary by changing the orientation of pixel projection components and/or pixel elements.

Figure 2A:
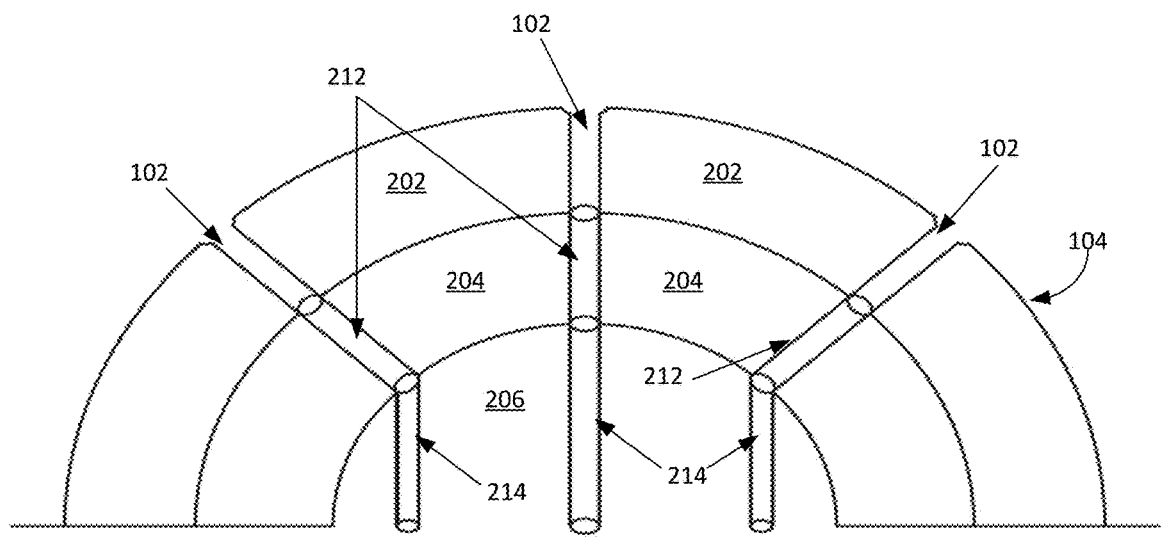
FIG. 2A illustrates a cross-sectional view of an example pixel projection component, consistent with embodiments disclosed herein.

FIGS. 2A-D illustrate a cross-sectional view of an example pixel projection component 100. Referring to FIG. 2A, example pixel projection component 100 may include outer surface 104 with apertures 102. The apertures may traverse a distal layer 202, such that a distal opening of an aperture 102 is located at outer surface 104 of distal layer 202, and a proximal opening of the aperture 102 is located on an inner surface of distal layer 202. Distal layer 202 may be solid or hollow. In examples in which distal layer 202 is hollow, the outer walls of apertures 102 may provide support between the outer and inner surfaces of distal layer 202.

Distal layer 202 may be fabricated from plastic, composite, metal, or other solid materials.

As illustrated in FIG. 2A, distal layer 202 covers an intermediate layer 204, which in turn covers a proximal layer 206. Light guides 212 may be disposed within intermediate layer 204 and light emitting elements 214 may be disposed within proximal layer 206. Light guides 212 may be oriented to optically couple light emitting elements 214 to apertures 102. For example, distal ends of light emitting elements 214 may be positioned to direct light into corresponding proximal ends of light guides 212, and distal ends of light guides 112 may be positioned to direct light into corresponding proximal openings of apertures 102. Light emitting elements 214 may include light emitting diodes (LEDs), organic light emitting diodes (OLEDs), laser diodes, laser emitters, fluorescent or incandescent light emitters, bioluminescent emitters, or other light sources. In some examples, a display panel, display screen, display projector, or other image display may be used in place of light emitting elements 214 to present an image to the proximal ends of light guides 212. In some examples, light emitting elements 214 may be communicatively coupled to and/or controlled by a display driver (i.e., display driver 500 as disclosed herein).

Light guides 212 may be fabricated from glass, doped glass, plastic, doped plastic, composite materials, crystals, translucent liquids, or other translucent materials capable of internally refracting and guiding electro-magnetic waves. In some examples, light guides 212 may be micro- and/or nano-machined wave guides. In some examples, light guides 212 may be single-mode or multi-mode fiber optic cables. In some examples, light guides 212 may be replaced by pinhole lenses, lens systems, or other optical systems configured to direct light from light emitting elements 214 through apertures 102.

The example illustrated in FIG. 2A illustrates an embodiment in which each individual light emitting element 214 directs light into a single light guide 212 and through a single aperture 102. Accordingly, the light emitting element to light guide to aperture ratio is 1 to 1 to 1. A proximal end of the light guides 212, which may include fiber optic light guides, elastic light guides, liquid light guides, etc., is positioned to accept the image data from the light emitting elements 214. The light guides 212 also have a distal end which is positioned to transmit the image data through a plurality of apertures 102. As illustrated in FIG. 2A, a single light guide 212 transmits the image data through a single aperture 102. As illustrated in FIG. 2A, light emitting elements 214 may be positioned at an angle with respect to light guides 212. The relational angles between apertures 102, light guides 212, and light emitting elements 214 are shown in FIG. 2A for illustrative purposes only, but actual angles between these components may vary. Each sub-optical system of aperture 102, light guide 212, and light emitting element 214 is configured to project light from a distal opening of aperture 102 at a selected angle relative to adjacent sub-optical systems within pixel projection component 100.

Figure 2B:
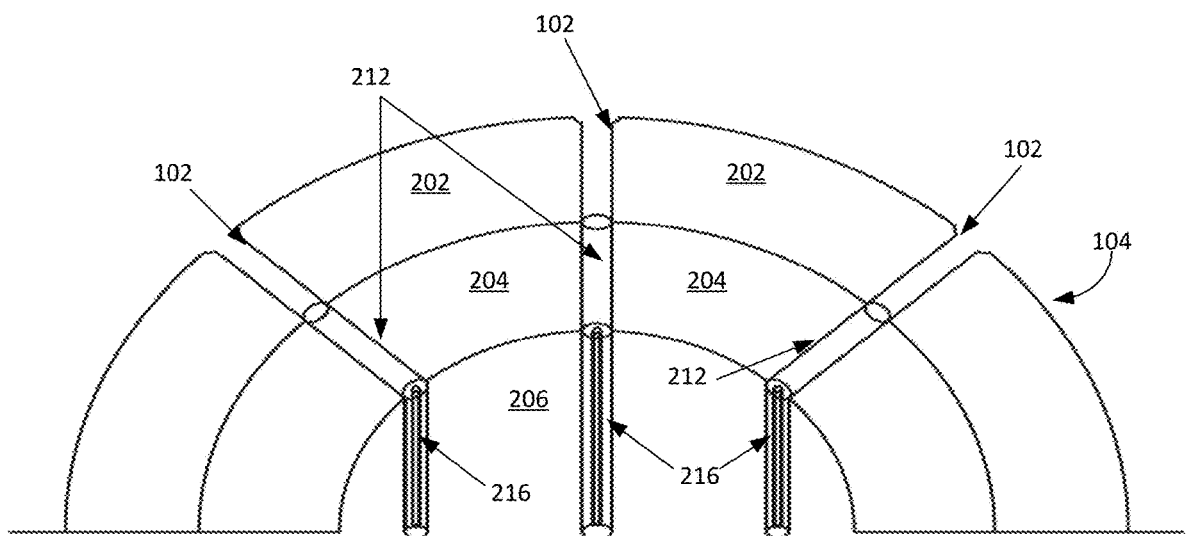
FIG. 2B illustrates a cross-sectional view of an example pixel projection component, consistent with embodiments disclosed herein.

FIG. 2B illustrates an example pixel projection component in which multiple (m) light emitting elements 216 number are positioned to direct light through a single light guide 212, and/or a single aperture 102. Accordingly, the light emitting element to light guide to aperture ratio of the example shown in FIG. 2B is m:1:1. For example, multiple light emitting elements 216 may be used to create different color effects (e.g., by using RGB or CMKY color mixing techniques, or other color mixing techniques). Multiple light emitting elements 216 may also be used to create different display effects.

Figure 2C:
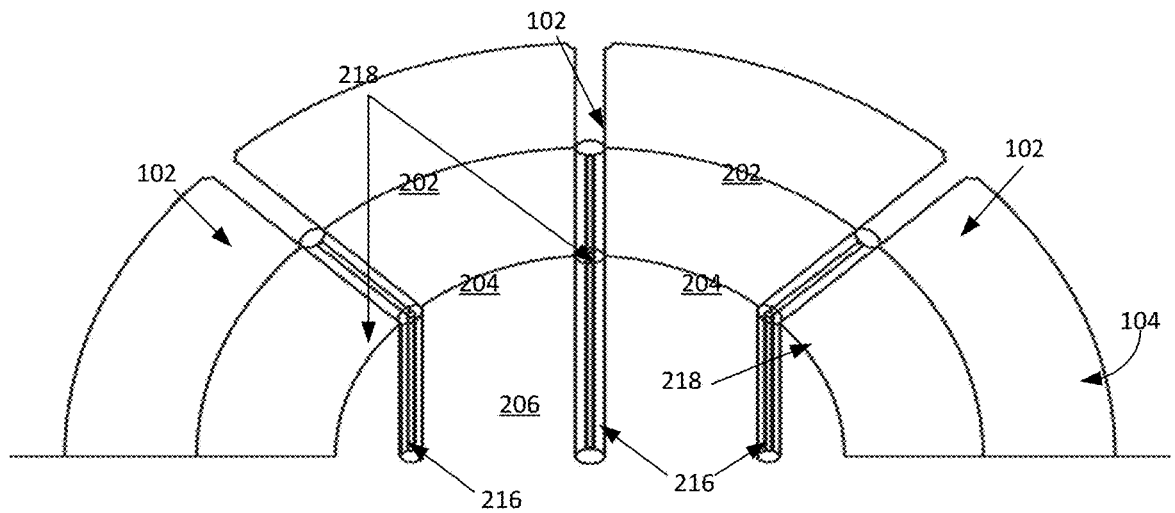
FIG. 2C illustrates a cross-sectional view of an example pixel projection component, consistent with embodiments disclosed herein.

FIG. 2C illustrates an example pixel projection component in which m light emitting elements 216 are positioned to direct light through multiple (n) light guides 218, which are in turn positioned to direct light through a single aperture 102. Accordingly, the light emitting element to light guide to aperture ratio of the example shown in FIG. 2C is m:n:1. In some examples, m equals n.

Figure 2D:
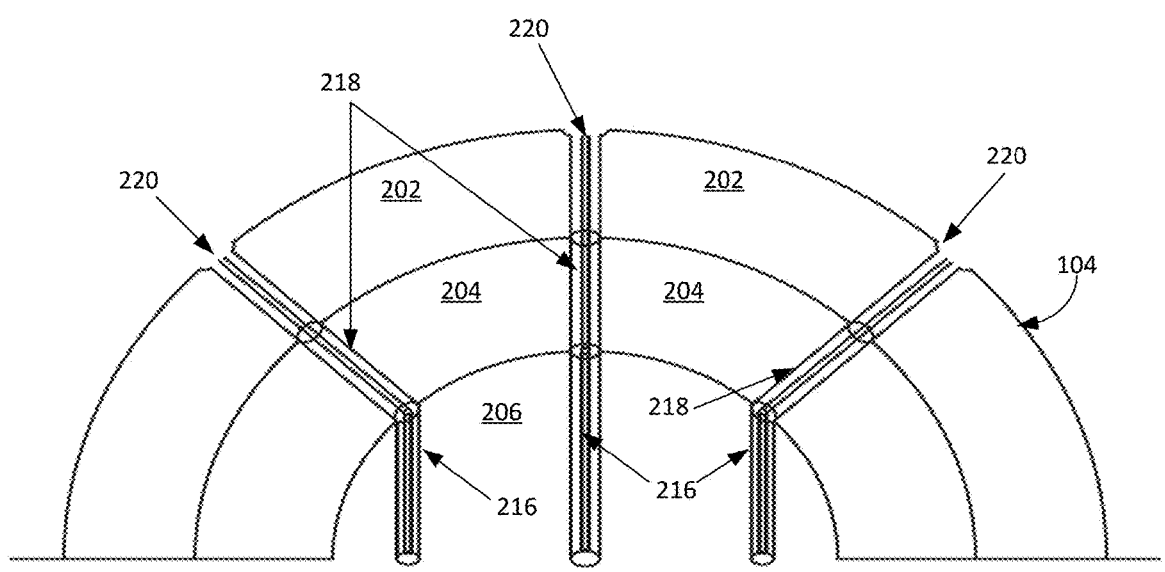
FIG. 2D illustrates a cross-sectional view of an example pixel projection component, consistent with embodiments disclosed herein.

FIG. 2D illustrates an example pixel projection component in which m light emitting elements 216 are positioned to direct light through multiple n light guides 218, which are in turn positioned to direct light through multiple (i) apertures 220. Accordingly, the light emitting element to light guide to aperture ratio of the example shown in FIG. 2D is m:n:i. In some examples, m equals n and i. In other examples, m, n, and/or i may be different.

Figure 3:
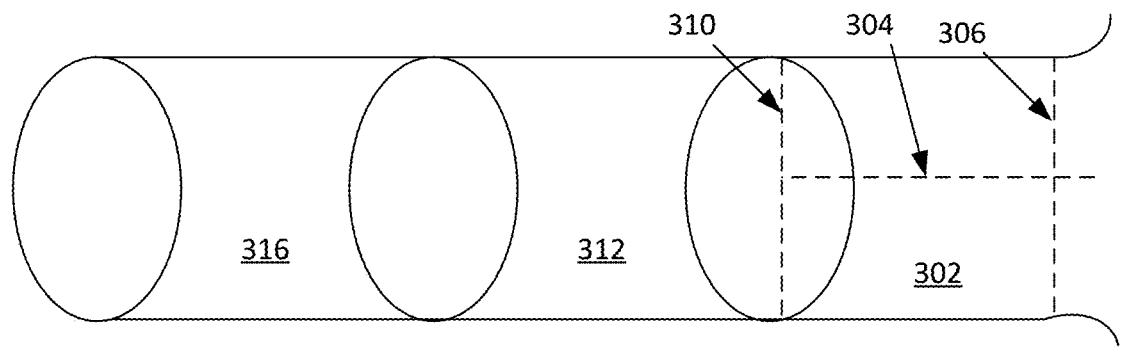
FIG. 3 illustrates an example pixel element from a pixel projection component, consistent with embodiments disclosed herein.

FIG. 3 illustrates an example pixel element from a pixel projection component. As illustrated in FIG. 3, in some embodiments, the diameter 310 of the distal end of light guide 312 may be about equal to the axial length 304 of aperture 302 (i.e., the distance between the proximal opening of aperture 302 and the distal opening of aperture 302). In some embodiments, the diameter 306 of an aperture 302 may be about equal to the axial length 304 of aperture 302. The relationships between dimensions of the aperture and light guide diameters, and the axial length of the aperture may vary in different embodiments of the disclosure.

Figure 4A:
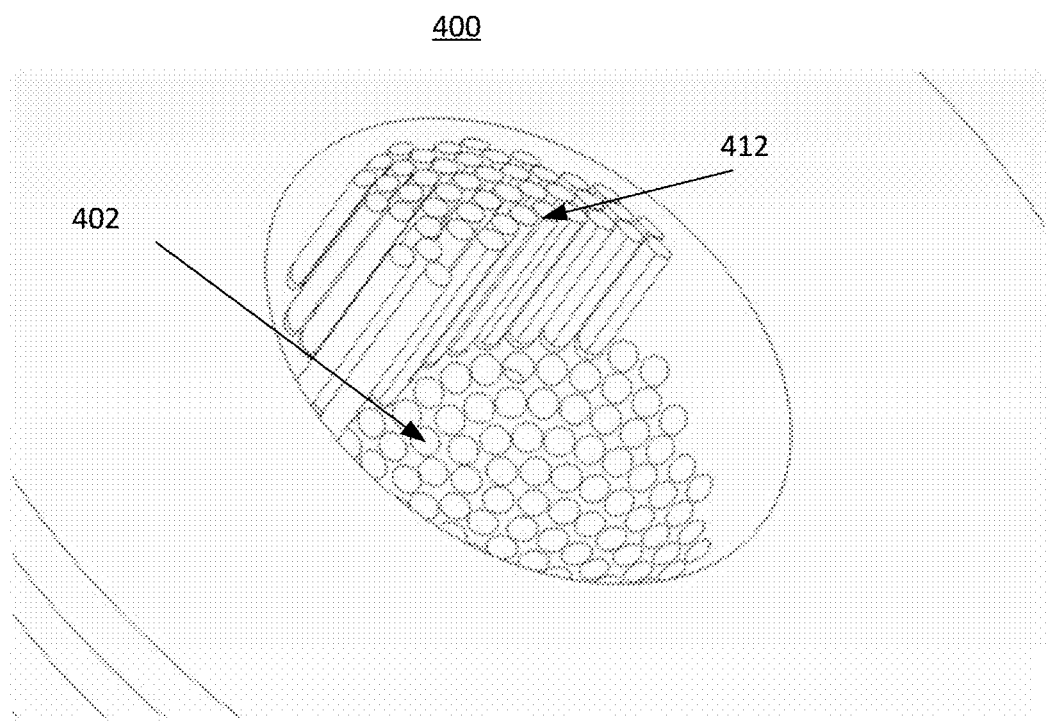
FIG. 4A illustrates a perspective deconstructed view of the back side of an example pixel projection component, consistent with embodiments disclosed herein.

FIG. 4A illustrates a perspective deconstructed view of a back side of an example pixel projection component 400. As illustrated in FIG. 4A, pixel projection component 400 includes multiple light guides 412 and multiple apertures 402. Proximal openings of apertures 402 receive light transmitted through light guides 412. Light may be generated and/or directed through light guides 412 by one or more light emitting elements, as described above. Alternatively, the light may be generated by a display panel, display screen, display projector, or other light generation device.

Figure 4B:
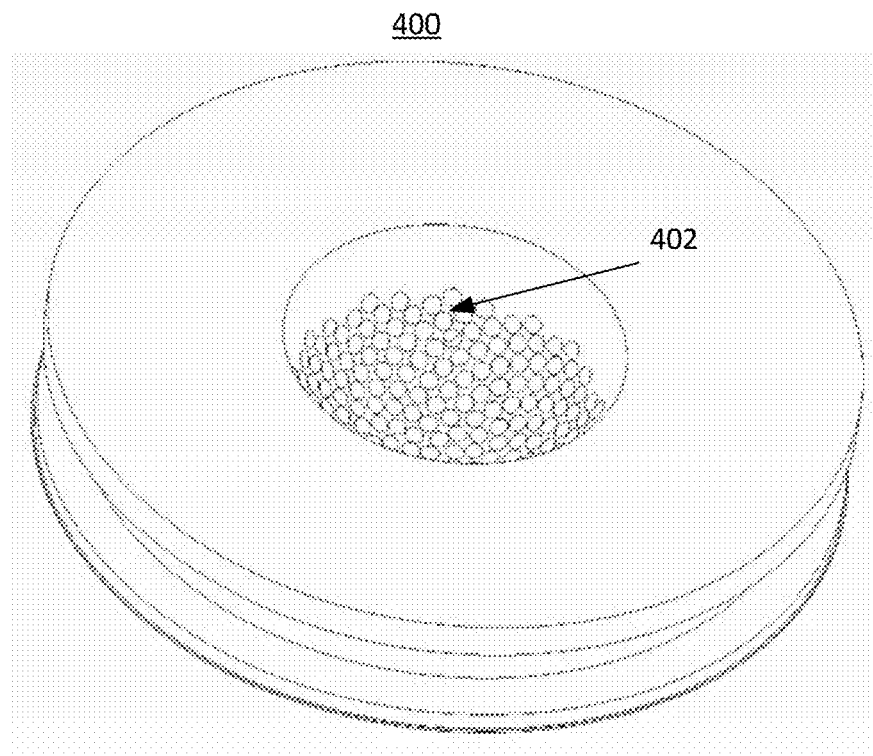
FIG. 4B illustrates a perspective view of the back side of an example pixel projection component, consistent with embodiments disclosed herein.

FIG. 4B illustrates a perspective view of the back side of an example pixel projection component 400, with the light guides 412 removed from the illustration to provide a clearer view of the proximal openings of apertures 402.

Figure 5:
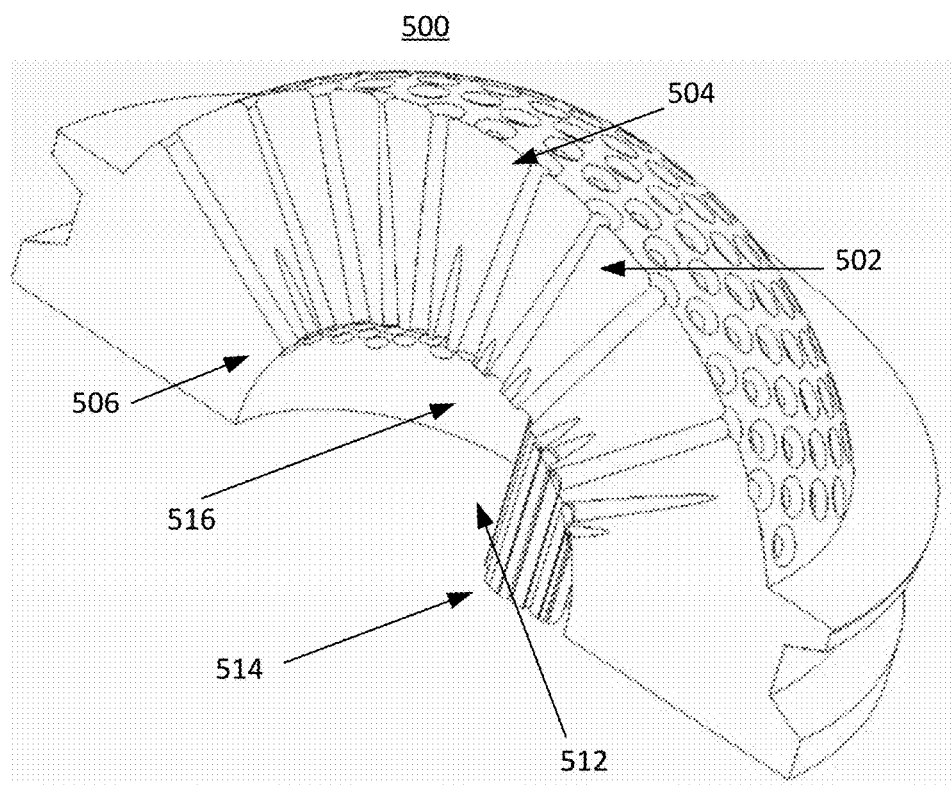
FIG. 5 illustrates a perspective cross-section view of an example pixel projection component, consistent with embodiments disclosed herein.

FIG. 5 illustrates a perspective cross-section view of an example pixel projection component 500. As illustrated in FIG. 5, pixel projection component 500 may include multiple apertures 502 dispersed along a distal layer of pixel component 500, the distal layer having a convex outer surface 504, a concave inner surface 506, and multipole apertures 502 that traverse the distal layer between the outer surface 504 and inner surface 506. Pixel projection component 500 also includes multiple light guides 512 which direct light into apertures 502. Lights guides 512 are positioned to transmit light received from a proximal end 514, through the light guide 512, and out a distal end 516. Light exiting distal end 516 of wave guide 512 is directed into a proximal end of aperture 502. Accordingly, light guides 512 optically couple the light emitting elements to apertures 502.

Figure 6:
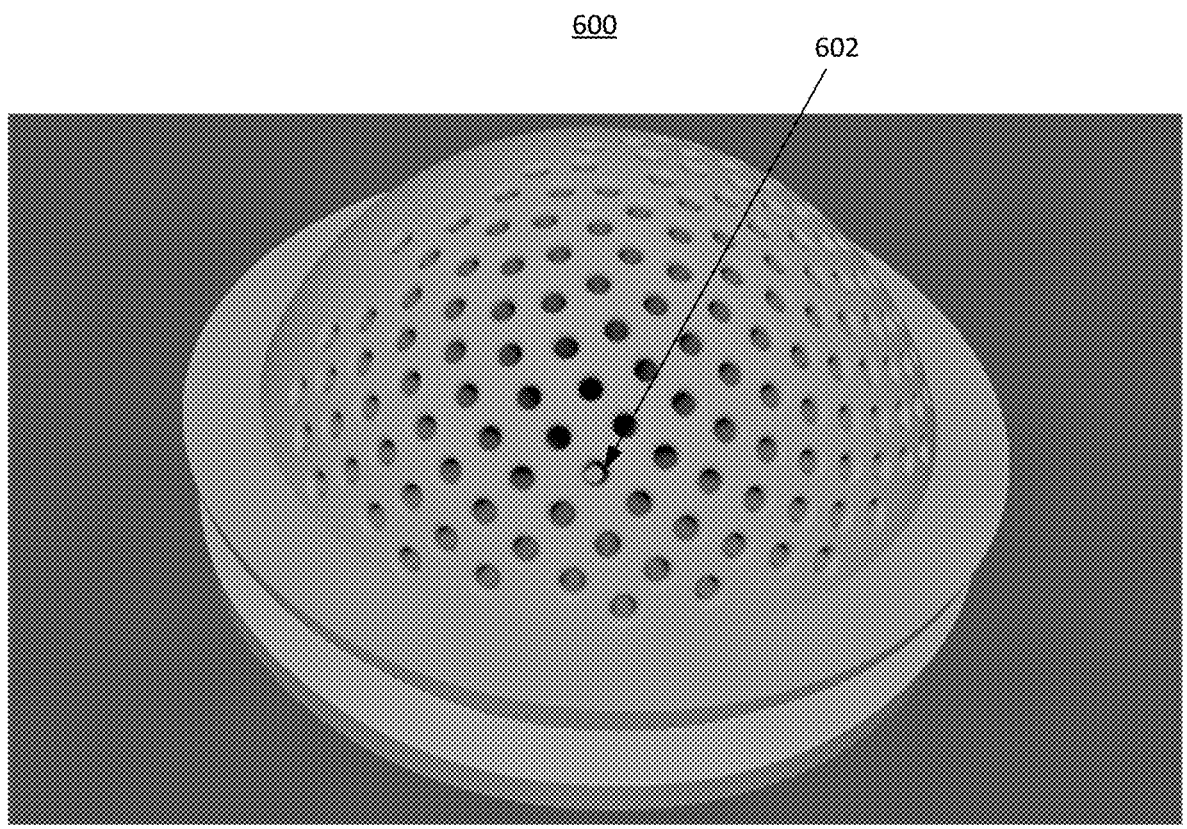
FIG. 6 illustrates a perspective view of an example pixel projection component, consistent with embodiments disclosed herein.

FIG. 6 illustrates a perspective view of an example pixel projection component 600. As illustrated in FIG. 6, each pixel element on the pixel projection component 600 is oriented to direct light in a different direction, and corresponding apertures from each pixel element limit the transmission of light to a limited field of view, directed towards a target vantage point. For example, a viewer located at a target vantage point viewing the pixel projection component 600 at a similar perspective angle as what is illustrated in FIG. 6 may see light being transmitted from pixel element 602, as illustrated, but not from any other pixel element on the pixel projection component. As the viewer moves to different vantage points, the viewer may see light projected from other pixel elements on the pixel projection component, but only one pixel element at a time.

Figure 7A:
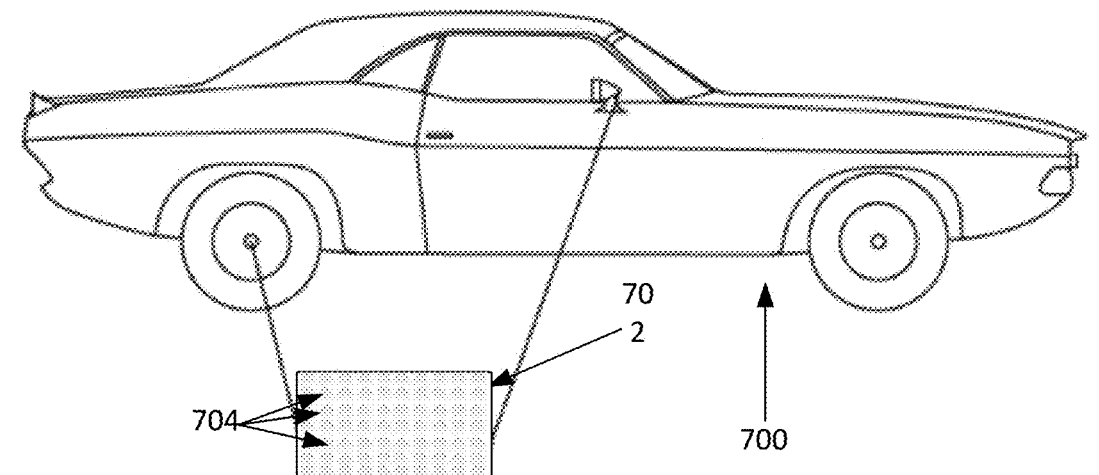
FIG. 7A illustrates an example image from a front-on vantage point as projected from a display panel comprising pixel projection components as disclosed herein.
Figure 7B:
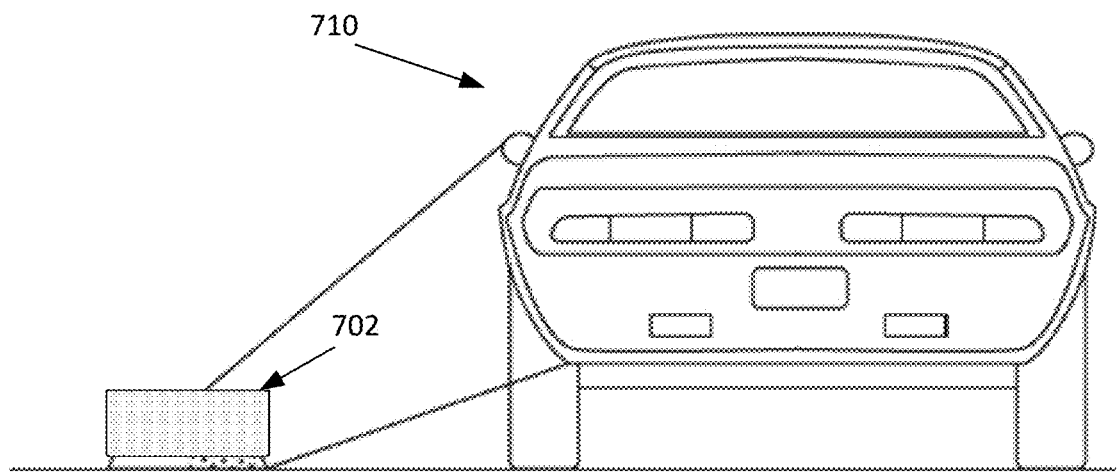
FIG. 7B illustrates an example image from a side-view vantage point as projected from a display panel comprising pixel projection components as disclosed herein.
Figure 7C:
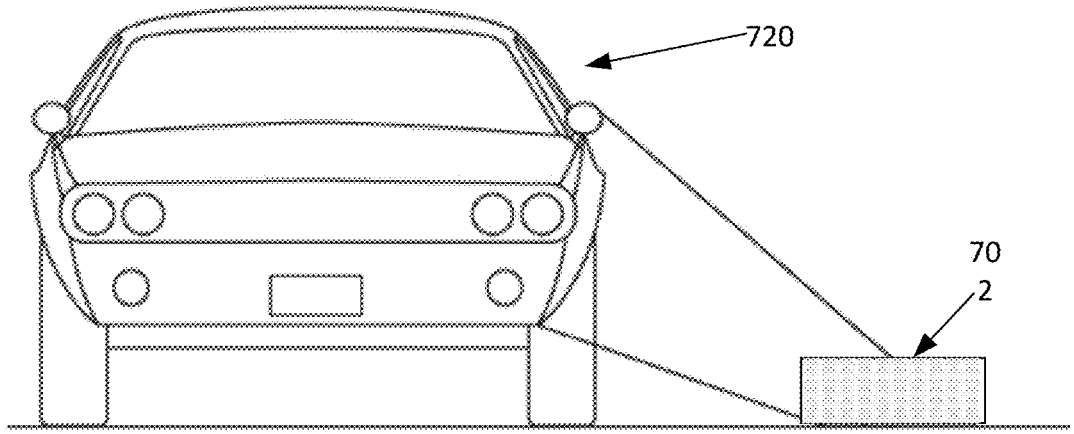
FIG. 7C illustrates an example image from a side-view vantage point as projected from a display panel comprising pixel projection components as disclosed herein.

FIGS. 7A-7C illustrate an example image as projected from a display panel comprising pixel projection components. Referring to FIG. 7A, a front-on vantage point of an example image 700 is illustrated as projected from an example display panel 702 comprising one or more pixel projection components 704. Image data used to project image 700 may be stored in a data store as a pixel array comprising pixel information used by a display driver to activate individual pixel elements within each pixel projection component 704. Each of the pixel projection components 704 may be configured to project a single light point, through each aperture of the pixel projection component, to target vantage points. As illustrated in FIG. 7A, one such target vantage point may be a front-on view, and the pixel array used to activate pixel components for the front-on view vantage point may be image 700 (e.g., a side view of a car, in this example). When all of the pixel projection components 704 are projecting all of the individual image points of the vehicle simultaneously, a full view of the vehicle may be experienced by a viewer. The pixel array may include multiple views of a given image, such that the multiple views are projected by the pixel projection components 704 to accomplish the 3-dimensional appearance of the subject matter as the target viewer moves to different vantage points. Through the use of individual pixel elements, and their corresponding apertures, in each of the pixel projection components 704, a viewer will only see light projected from select pixel elements (e.g., one pixel element) when standing at a given vantage point, as described in FIG. 6. In some examples, a viewer may be presented with light from two different pixel elements from the same pixel component to create a stereoscopic effect, as described above. In either example, the viewer is presented with a single image view from each given vantage point, and a different image view from a different vantage point.

FIG. 7B illustrates an example image 710 from a side-view vantage point as projected from display panel 702 comprising pixel projection components 704. For example, image 710 may be a different view of the subject matter of image 700 (e.g., the back of the car from image 700). As illustrated in FIG. 7B, select pixel elements from pixel projection components 702 will direct light to the vantage point of a viewer standing in this side-view vantage point. Similarly, FIG. 7C illustrates an example image 720 from an alternate side-view vantage point as projected from a display panel 702 comprising pixel projection components 704. For example, image 720 may be a different view of the subject matter of images 700 and 710 (e.g., the front of the car from images 700 and 710). As illustrated in FIG. 7C, select pixel elements from pixel projection components 702 will direct light to the vantage point of a viewer standing in this side-view vantage point.

Figure 8:
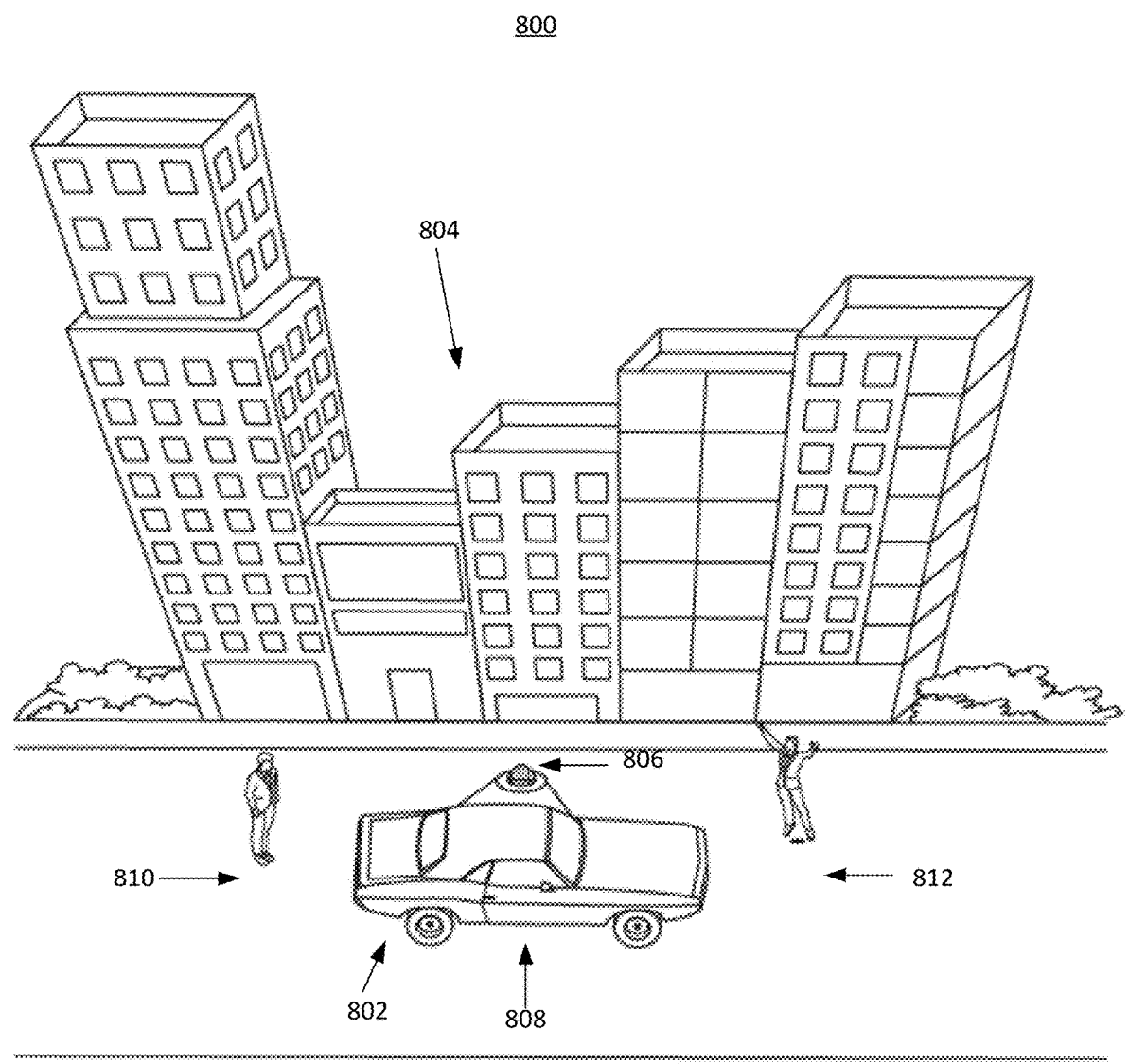
FIG. 8 illustrates an example integrated display including a scenic backdrop and an image projected from a display panel comprising pixel projection components as disclosed herein.

FIG. 8 illustrates a perspective view of an example integrated display including a scenic backdrop and an image projected from a display panel comprising pixel projection components as disclosed herein. As an example, and as illustrated in FIG. 8, the image of a vehicle 802 (e.g., as illustrated in different image views 700, 710, and 720 from FIGS. 7A-C) may complement a city backdrop 804 in order to complete an integrated display 800 of a vehicle driving through a city street. The city backdrop 804 may be a poster, cutout, or other fixed-medium display, and may include images of buildings and people, to create the image of a city street. The integrated display provides viewers with an added level of immersion when viewing the display. In some examples, multiple pixel projection components may be used to create 3-dimensional viewing effects of different parts of the scene.

For example, a viewer standing at vantage point 808 of integrated display 800 will see the front-on view of the vehicle 802 as illustrated in FIG. 7A. A viewer standing at vantage point 810 of integrated display 800 will see the side-view of the vehicle 802 as illustrated in FIG. 7B. A viewer standing at vantage point 812 of integrated display 800 will see the side-view of the vehicle 802 as illustrated in FIG. 7C.

Figure 9:
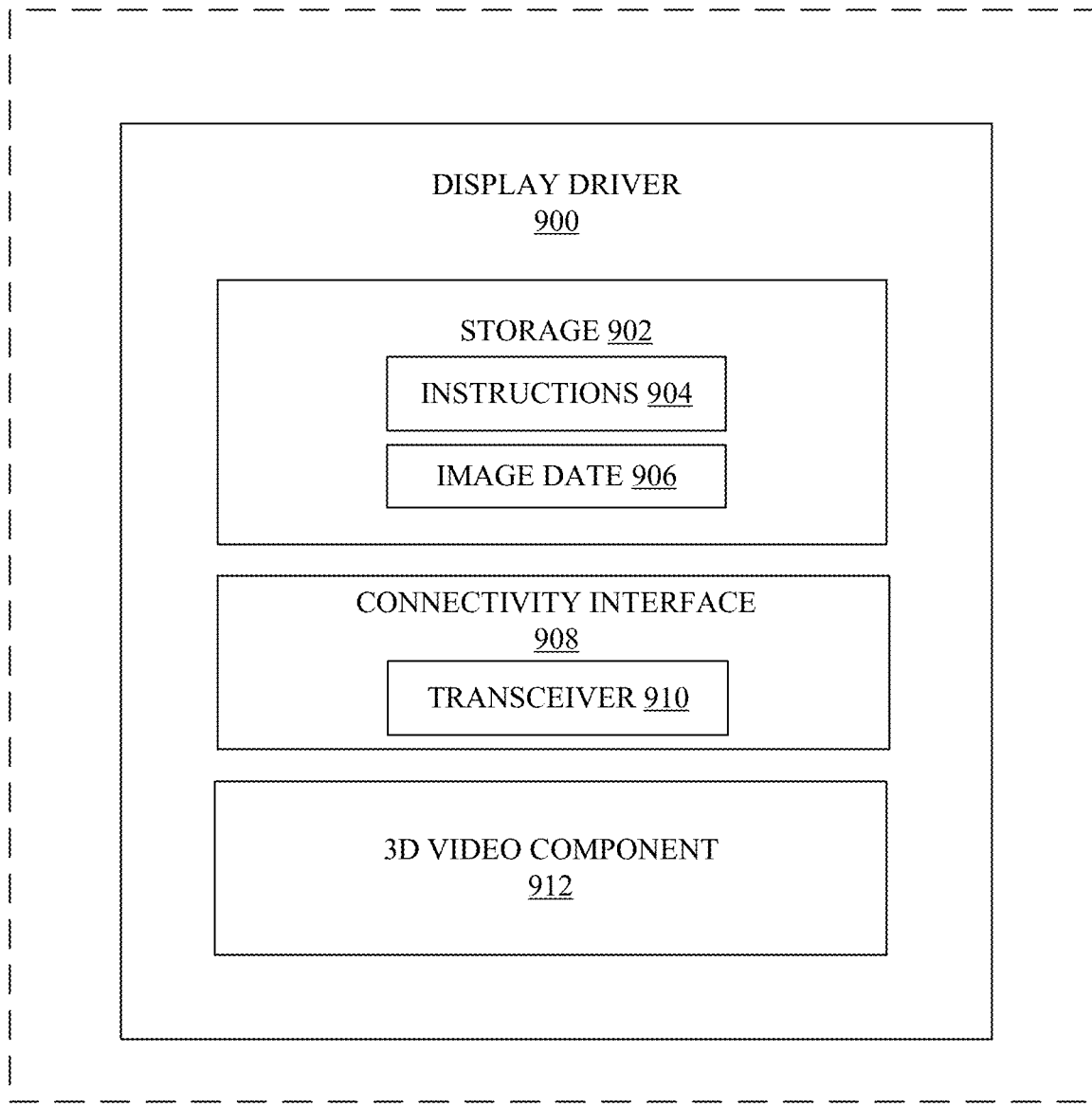
FIG. 9 illustrates a block diagram of an example display driver, consistent with embodiments disclosed herein.

FIG. 9 is a block diagram illustrating an example display driver that may be used in connection with the pixel projection components disclosed herein. Display driver 900 may be couplable to multiple light emitting elements. As illustrated, display driver 900 may include connectivity interface 908, which may further include transceiver 910 to communicatively couple display driver 900 to, for example, multiple light emitting elements. In the illustrated embodiment, display driver 900 further includes storage 902 (which in turn may store instructions 904 and image data 906), and 3D video component 912.

Referring to FIG. 9, connectivity interface 908 may interface display driver 900 to the light emitting elements. Transceiver 910 of connectivity interface 908 may include multiple transceiver modules operable on different wireless standards. Transceiver 910 may be used to send/receive image data. Transceiver 910 may send image data to the light emitting elements and may receive image data or other information from external devices such as a camera or optical or proximity sensor. Additionally, connectivity interface 908 may include additional components for controlling radio and/or wired connections, such as baseband and/or Ethernet modems, audio/video codecs, and so on.

In embodiments, transceiver 910 may utilize Bluetooth, ZIGBEE, Wi-Fi, GPS, cellular technology, or some combination thereof. Further, although FIG. 9 illustrates a single transceiver 910 for transmitting/receiving image data, separate transceivers may be dedicated for communicating particular types of data or for doing so in particular fashions. In some cases, transceiver 910 may include a low energy transmitter/receiver such as a near field communications (NFC) transmitter/receiver or a Bluetooth Low Energy (BLE) transmitter/receiver. In further example implementations, separate wireless transceivers may be provided for receiving/transmitting high fidelity audio and/or video data. In yet additional embodiments, a wired interface (e.g., micro-USB, HDMI, etc.) may be used for communicating data between display driver 900 and the light emitting elements. In some cases, transceiver 910 may be implemented as only a transmitter with no receiver. In some cases, transceiver 910 may be implemented as only a receiver with no transmitter.

Storage 902 may include volatile memory (e.g., RAM) and/or non-volatile memory (e.g., flash storage), may include any of EPROM, EEPROM, cache, or may include some combination/variation thereof. In various embodiments, storage 902 may store image and other data collected by an external camera or optical or proximity sensor. Storage 902 may also be used to store downloaded content (e.g., image data, which may include pre-rendered animations, previously captured video or images of an actor or a performance, live captured images or video, or any combination of the above images and video) for later retrieval and use, e.g., in connection with the generation and projection of a three-dimensional display. 3D video component 912 may include the ability to convert two-dimensional image data captured by an external camera into stereoscopic image data ready to be sent to the light emitting elements for three-dimensional display.

Figure 10:
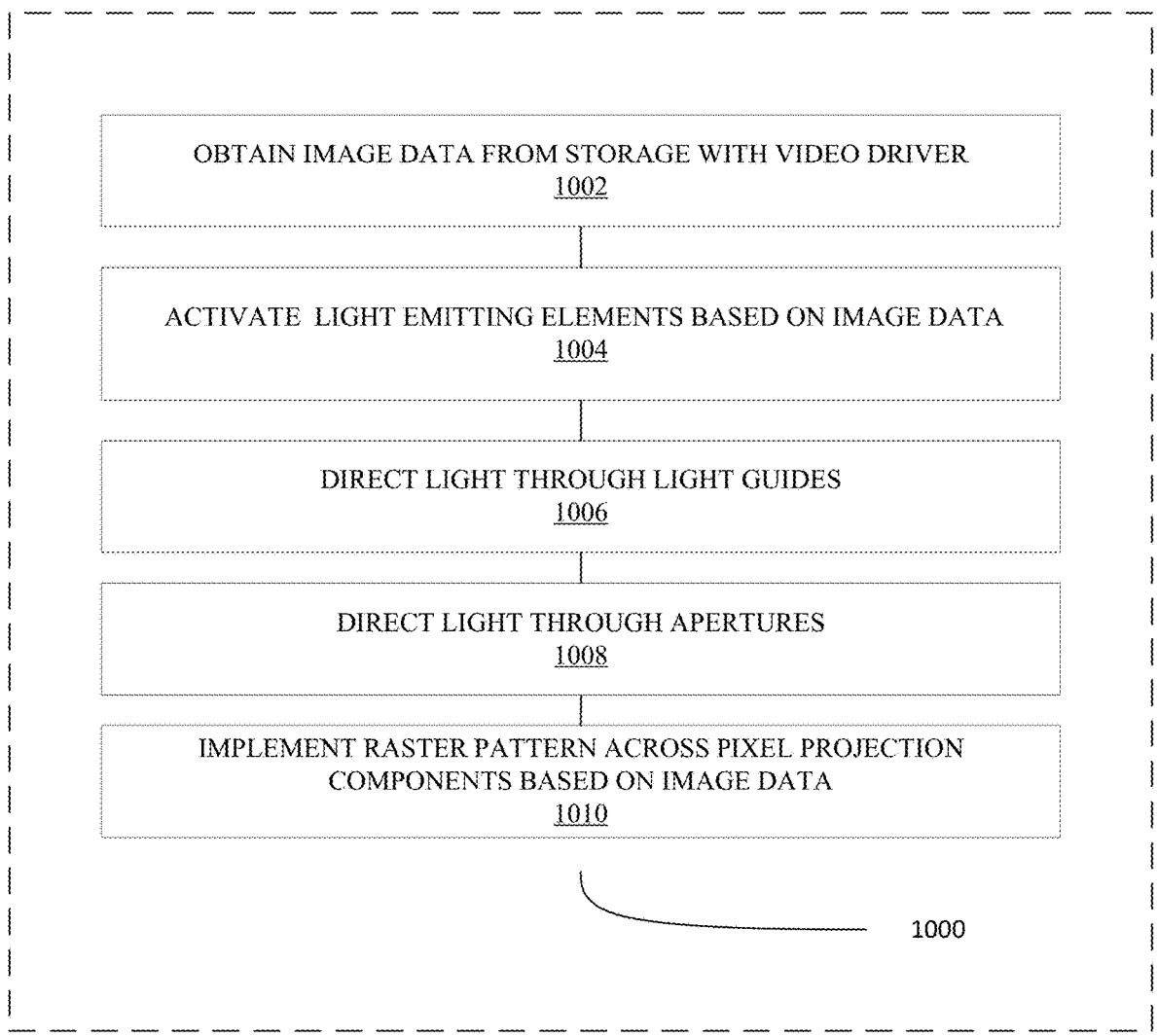
FIG. 10 illustrates an example method for projecting a three-dimensional perspective image using pixel projection components, consistent with embodiments disclosed herein.

FIG. 10 illustrates an example method 1000 for projecting multi-vantage point and/or 3-dimensional images using a display panel comprising pixel projection components as disclosed herein. Here it should be appreciated that the operations described in connection with method 1000 and/or other methods described herein need not be performed in the order described or shown. Additionally, it should be appreciated that any operation described may include one or more sub-operations, and/or may be a sub-operation of another operation. Furthermore, additional operation(s) may be interposed between any two described operations without departing from the scope of the disclosure.

At operation 1002, method 1000 includes a display driver obtaining image data from storage. For example, the display driver may obtain pre-rendered image data from storage of an animation desired to be projected from the pixel projection components. As an example, the display driver may obtain an animation of a moving vehicle which has been pre-rendered for projection in connection with an integrated display including a city backdrop.

Once the image data is obtained, the multiple light emitting elements are then activated at step 1004 based on the image data. The multiple light emitting elements, which may be optically coupled to the multiple light guides, directs the light containing the image data through the multiple light guides at step 1006. As an example, once activated in step 1004, the light emitting elements may direct light including the individual image points of a vehicle through the light guides.

The light is then directed through the multiple apertures in step 1008 in order to facilitate the projection of the image data originally obtained by the display driver. As an example, the individual image points of an image of a vehicle may be directed through the multiple apertures of the pixel projection components in order to project the entire image of the vehicle.

Lastly, at step 1010, the pixel projection components may implement a raster pattern based on the image data. As an example, the image of a vehicle may be subdivided into a sequence of horizontal lines. The projection of the vehicle image may occur in a timed raster pattern, where each horizontal line of the vehicle image is displayed progressively, until the entire image is displayed. Projecting the image of a vehicle in a raster pattern would be fast enough to display all of the pixel elements of the vehicle at least within the time it takes to display a single frame of a video of the vehicle.

Figure 11:
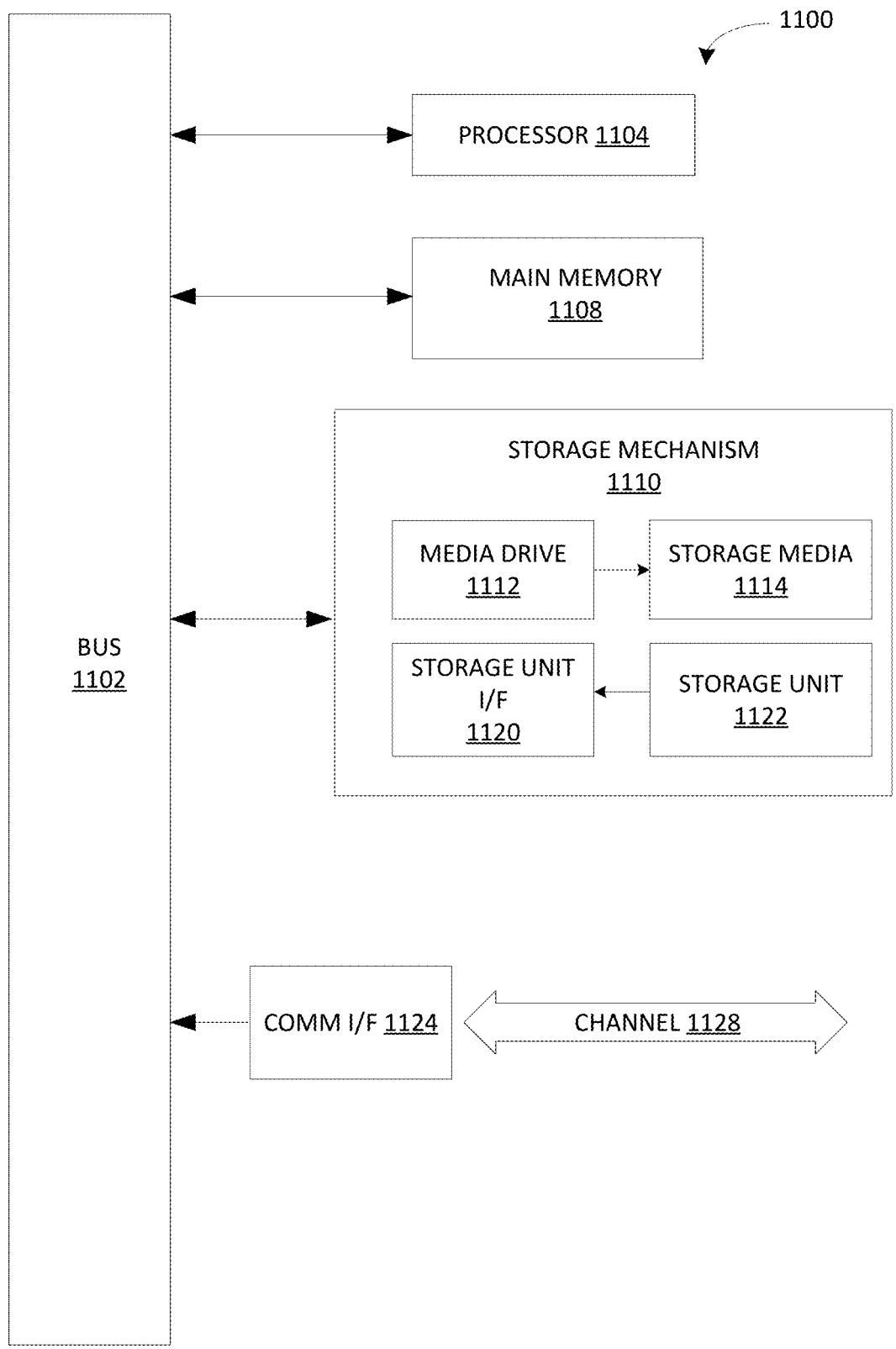
FIG. 11 illustrates an example computer component that may be used to implement embodiments disclosed herein.

As used herein, the terms logical circuit and component might describe a given unit of functionality that can be performed in accordance with one or more embodiments of the technology disclosed herein. As used herein, either a logical circuit or a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components, logical circuits, or components of the technology are implemented in whole or in part using software, in one embodiment, these software elements can be implemented to operate with a computing or logical circuit capable of carrying out the functionality described with respect thereto. One such example logical circuit is shown in FIG. 11. Various embodiments are described in terms of this example logical circuit 1100. After reading this description, it will become apparent to a person skilled in the relevant art how to implement the technology using other logical circuits or architectures.

Referring now to FIG. 11, computing system 1100 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Logical circuit 1100 might represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 1100 might include, for example, one or more processors, controllers, control components, or other processing devices, such as a processor 1104. Processor 1104 might be implemented using a general-purpose or special-purpose processing component such as, for example, a microprocessor, controller, or other control logic. In the illustrated example, processor 1104 is connected to a bus 1102, although any communication medium can be used to facilitate interaction with other components of logical circuit 1100 or to communicate externally.

Computing system 1100 might include one or more memory components, simply referred to herein as main memory 1108. For example, preferably random access memory (RAM) or other dynamic memory, might be used for storing information and instructions to be executed by processor 1104. Main memory 1108 might be used for storing temporary variables or other intermediate information during execution of instructions to be executed by processor 1104. Logical circuit 1100 might likewise include a read only memory ("ROM") or other static storage device coupled to bus 1102 for storing static information and instructions for processor 1104.

The computing system 1100 might include one or more various forms of information storage mechanism 1110, which might include, for example, a media drive 1112 and a storage unit interface 1120. The media drive 1112 might include a drive or other mechanism to support fixed or removable storage media 1114. For example, a hard disk drive, a floppy disk drive, a magnetic tape drive, an optical disk drive, a CD or DVD drive (R or RW), or other removable or fixed media drive might be provided. Accordingly, storage media 1114 might include, for example, a hard disk, a floppy disk, magnetic tape, cartridge, optical disk, a CD or DVD, or other fixed or removable medium that is read by, written to or accessed by media drive 1112. As these examples illustrate, the storage media 1114 can include a computer usable storage medium having stored therein computer software or data.

In alternative embodiments, information storage mechanism 1110 might include other similar instrumentalities for allowing computer programs or other instructions or data to be loaded into logical circuit 1100. Such instrumentalities might include, for example, a fixed or removable storage unit 1122 and an interface 1120. Examples of such storage units 1122 and interfaces 1120 can include a program cartridge and cartridge interface, a removable memory (for example, a flash memory or other removable memory component) and memory slot, a PCMCIA slot and card, and other fixed or removable storage units 1122 and interfaces 1120 that allow software and data to be transferred from the storage unit 1122 to logical circuit 1100.

Logical circuit 1100 might include a communications interface 1124. Communications interface 1124 might be used to allow software and data to be transferred between logical circuit 1100 and external devices. Examples of communications interface 1124 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1124 might typically be carried on signals, which can be electronic, electromagnetic (which includes optical) or other signals capable of being exchanged by a given communications interface 1124. These signals might be provided to communications interface 1124 via a channel 1128. This channel 1128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1108, storage unit 1120, media 1114, and channel 1128. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 1100 to perform features or functions of the disclosed technology as discussed herein.

Although FIG. 11 depicts a computer network, it is understood that the disclosure is not limited to operation with a computer network, but rather, the disclosure may be practiced in any suitable electronic device. Accordingly, the computer network depicted in FIG. 11 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of an component, whether control logic or other components, can be combined in a single package or separately maintained and can be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A pixel projection component for projecting a multi-vantage point light-field, the pixel projection component comprising:
   a distal layer with a plurality of apertures disposed therein, each of the plurality of apertures traversing the distal layer between a convex outer surface and a concave inner surface; and
   an intermediate layer comprising a plurality of light guides, the intermediate layer being mechanically coupled to the distal layer;
   wherein a proximal end of a first light guide of the plurality of light guides is oriented to accept a first light transmission from a first light source;
   a distal end of the first light guide is oriented to transmit the first light transmission through a first aperture of the plurality of apertures, such that light is directed to a first vantage point;
   a proximal end of a second light guide of the plurality of light guides is oriented to accept a second light transmission from a second light source; and
   a distal end of the second light guide is oriented to transmit the second light transmission through a second aperture of the plurality of apertures, such that light is directed to a second vantage point.

2. The pixel projection component of claim 1, wherein the first light transmission is not visible from the second vantage point and the second light transmission is not visible from the first vantage point.

3. The pixel projection component of claim 1, further comprising a proximal layer, the proximal layer comprising a plurality of light emitting elements, wherein the first light source comprises a first light emitting element of the plurality of light emitting elements and the second light source comprises a second light emitting element of the plurality of light emitting elements.

4. The pixel projection component of claim 1, wherein a ratio of axial length to diameter for each of the plurality of apertures is about 1 to 1.

5. The pixel projection component of claim 3, wherein the light emitting elements comprise light emitting diodes (LEDs).

6. The pixel projection component of claim 1, wherein each of the plurality of apertures is located at an equal distance from each adjacent aperture.

7. The pixel projection component of claim 1, wherein the plurality of apertures are located in a spiral pattern using the Fibonacci sequence.

8. The pixel projection component of claim 1, wherein the plurality of light guides comprises fiber optic cables or micro-machined wave guides.

9. The pixel projection component of claim 1, wherein a proximal end of a third light guide of the plurality of light guides is oriented to accept a third light transmission from a third light source; and
   a distal end of the third light guide is oriented to transmit the third light transmission through a third aperture of the plurality of apertures, such that light is directed to a third vantage point;
   wherein the first light transmission is not visible from the second vantage point or the third vantage point;
   the second light transmission is not visible from the first vantage point or the third vantage point; and
   the third light transmission is not visible from the first vantage point or the second vantage point.

10. A multi-vantage point light-field display system comprising:
    a data store, a display driver, and a display panel, the display panel comprising a plurality of pixel projection components, wherein each pixel projection component comprises:
       a distal layer with a plurality of apertures disposed therein, each of the plurality of apertures traversing the distal layer between a convex outer surface and a concave inner surface; and
       an intermediate layer comprising a plurality of light guides, the intermediate layer being mechanically coupled to the distal layer;
       wherein a proximal end of a first light guide of the plurality of light guides is oriented to accept a first light transmission from a first light source;
       a distal end of the first light guide is oriented to transmit the first light transmission through a first aperture of the plurality of apertures, such that light is directed to a first vantage point;
       a proximal end of a second light guide of the plurality of light guides is oriented to accept a second light transmission from a second light source; and
       a distal end of the second light guide is oriented to transmit the second light transmission through a second aperture of the plurality of apertures, such that light is directed to a second vantage point.

11. The multi-vantage point light-field display system of claim 10, wherein each pixel projection component further comprises a plurality of light emitting elements, wherein the first light source comprises a first light emitting element of the plurality of light emitting elements and the second light source comprises a second light emitting element of the plurality of light emitting elements.

12. The multi-vantage point light-field display system of claim 11, wherein the display driver comprises a processor and a non-transitory memory with computer instructions embedded thereon, the computer instructions configured to cause the processor to obtain image data from a pixel array stored in the data store and cause the light emitting elements to generate light based on the image data from the pixel array.

13. The multi-vantage point light-field display system of claim 12, wherein the pixel array comprises pixel data from a plurality of views of a subject matter, wherein each view of the plurality of views corresponds to a corresponding target vantage point, and the display driver is configured, for each pixel projection component, to activate a selected light emitting element of the plurality of light emitting elements corresponding to a selected view of the plurality of views.

14. The multi-vantage point light-field display system of claim 11, wherein the light emitting elements comprise light emitting diodes (LEDs).

15. The multi-vantage point light-field display system of claim 10, wherein a ratio of axial length to diameter for each of the plurality of apertures is about 1 to 1.

16. The multi-vantage point light-field display system of claim 10, wherein the plurality of light guides comprises fiber optic cables or micro-machined wave guides.

17. The multi-vantage point light-field display system of claim 10, wherein the display panel is integrated with a fixed-medium display.

18. A method of generating a multi-vantage point light-field display using a display driver and a pixel projection component comprising a distal layer with a plurality of apertures disposed therein, each of the plurality of apertures traversing the distal layer between a convex outer surface and a concave inner surface, and an intermediate layer comprising a plurality of light guides, the intermediate layer being mechanically coupled to the distal layer, the method comprising:

- obtaining, with the display driver, a pixel array from a data store;
- activating a first light emitting element to transmit a first light transmission based on image data extracted from the pixel array, the first light emitting element being optically coupled to a first light guide of the plurality of light guides;
- directing the first light transmission from the first light guide through a first aperture of the plurality of apertures to a first vantage point;
- activating a second light emitting element to transmit a second light transmission based on image data extracted from the pixel array, the second light emitting element being optically coupled to a second light guide of the plurality of light guides; and
- directing the second light transmission from the second light guide through a second aperture of the plurality of apertures to a second vantage point;
- wherein the first light transmission is not visible from the second vantage point and the second light transmission is not visible from the first vantage point.

19. The method of claim 18, further comprising obtaining, with the display driver, image data corresponding to multiple views of a subject matter, wherein each view corresponds to a target vantage point; and

- activating a selected light emitting element corresponding to a selected view of the subject matter.

20. The method of claim 18, wherein a ratio of axial length to diameter for each of the plurality of apertures is about 1 to 1, the plurality of light guides comprises fiber optic cables or micro-machined wave guides, and the first and second light emitting elements comprise LEDs.

* * * * *